Oct. 8, 1963  J. A. C. KENTFIELD  3,106,073
AIRCRAFT SYSTEMS INCORPORATING PRESSURE EXCHANGERS
Filed May 1, 1961  2 Sheets-Sheet 1

INVENTOR
JOHN ALAN CHARLES KENTFIELD
BY
Larson and Taylor
ATTORNEY

Oct. 8, 1963  J. A. C. KENTFIELD  3,106,073
AIRCRAFT SYSTEMS INCORPORATING PRESSURE EXCHANGERS
Filed May 1, 1961  2 Sheets-Sheet 2

INVENTOR  
JOHN ALAN CHARLES KENTFIELD  
BY  
Lawson and Taylor  
ATTORNEY 3,106,073
    AIRCRAFT SYSTEMS INCORPORATING PRESSURE
                      EXCHANGERS
John Alan Charles Kentfield, Worthing, England, assignor
  to Power Jets (Research & Development) Limited, London, England, a British company
            Filed May 1, 1961, Ser. No. 106,626
    Claims priority, application Great Britain May 31, 1960
                  10 Claims. (Cl. 62—402)

This invention relates to aircraft systems incorporating pressure exchangers. Examples of such systems are structure cooling, boundary layer suction and pressurization systems.

The term "pressure exchanger" is used herein to mean apparatus comprising cells in which one gas quantity expands, so compressing another gas quantity with which it is in contact, ducting to lead gas at different pressures substantially steadily to and from the cells and means to effect relative motion between the cells and the ducting.

The cells of a pressure exchanger are usually arranged in a circular array as a rotor and the rotor is customarily termed a "cell ring."

Such a pressure exchanger may have a stream of gas at an intermediate pressure introduced into the cells, and this stream is divided in the pressure exchanger to give two outlet streams, one at a pressure higher than the intermediate pressure and one at a pressure lower than the intermediate pressure. In this case the pressure exchanger is said to be operating as a pressure divider.

Alternatively, two streams of gas one at a high pressure and one at a lower pressure may be introduced into the cells and these streams are combined in the pressure exchanger to give a single stream of gas at an intermediate pressure. In this case the pressure exchanger is said to be operating as a pressure equalizer.

The passage of an aircraft through the atmosphere at high speed is known to cause heating of the external skin of the aircraft and consequently, by conduction, the remainder of the aircraft. If the speed is sufficiently high, the aircraft framework can experience a temperature rise such that it is no longer capable of performing its cohesive function. In such a case it is essential that means should be provided to maintain the aircraft at a safe temperature. To do this, it is necessary to provide a heat sink which, conveniently, can consist of a flow of coolant fluid.

It has already been proposed that a pressure exchanger, fed with ram air and operable as a pressure divider, may provide, from its low-pressure output, a relatively cold flow of air to be used as a heat sink.

According to the present invention an aircraft system incorporates a pressure exchanger operable as a pressure divider which divider has a high-pressure outlet duct and a lower-pressure outlet duct, a heat-exchange means having a hot pass communicating with the high-pressure outlet duct and a cold pass communicating with the lower-pressure outlet duct, and expansion means the inlet of which communicates with the outlet of the hot pass of the heat-exchange means and the exhaust flow of which provides a heat sink for the aircraft structure.

When pressurization of the aircraft cabin is required, the expansion means exhaust duct may communicate with the aircraft cabin.

The expansion means may be in the form of a turbine and this may be coupled to drive the cell ring of the pressure exchanger. For the purposes of providing starting and rotor speed control means, the turbine may also be coupled to drive the rotor of an electric motor-generator.

To provide control over the temperature and pressure of air passing to the aircraft cabin, a junction may be provided in the high-pressure outlet duct of the pressure divider which junction is controlled by an apportioning valve, the additional connection provided by this junction communicating, via a duct, with the expansion means exhaust duct. This arrangement provides a bypass of both the expansion means and the said heat-exchange means, so that a part or all of the flow in the high-pressure outlet duct may pass directly to the expansion means exhaust duct.

To provide an alternative means for driving the cell ring of the pressure exchanger and the rotor of the motor-generator when the said turbine is bypassed, an additional expansion means may be provided and this expansion means may derive its working fluid from the cabin of the aircraft.

Both the high-pressure output and the lower-pressure output of the divider may be ultimately discharged to the rear of the aircraft, thus providing an auxiliary source of propulsive thrust.

In an aircraft incorporating any of the foregoing systems, means providing aircraft boundary-layer suction apparatus may be provided by interposing in the high-pressure outlet duct at a point upstream of the said heat-exchange means and the expansion means, a junction controlled by a two-way valve, the additional connection provided by this junction communicating directly with a duct discharging to the rear of the aircraft, and by interposing in the lower-pressure outlet duct at a point upstream of the said heat-exchange means, a further junction controlled by a two-way valve, the additional connection provided by this junction communicating via a duct directly with a boundary-layer region of the aircraft, the two-way valves being conjointly operable at will to make the high-pressure outlet duct communicate directly and only with the duct discharging to the rear of the aircraft and to make the low-pressure outlet duct communicate via a duct directly and only at least a part of the boundary-layer region of the aircraft.

In each case, the intermediate pressure fluid input of the divider may be derived from the compressor of a gas-turbine engine of the aircraft.

Embodiments of the invention will now be described by way of example, with reference to FIGURE 1 shows the circuit of an aircraft cabin and structure cooling system in accordance with the invention;

Figure 1:
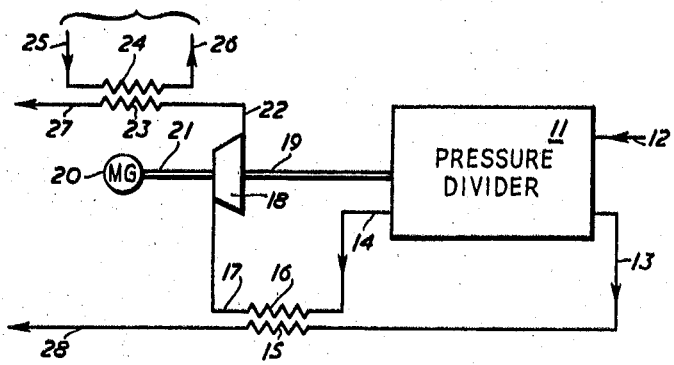

Referring to FIGURE 1, a pressure exchanger arranged to operate as a pressure divider 11 has an air inlet duct 12, a lower-pressure outlet duct 13 and a high-pressure outlet duct 14. The lower-pressure outlet duct 13 communicates with a cold-pass 15 of a first heat-exchanger whilst the high-pressure outlet duct 14 communicates with a hot-pass 16 of that heat exchanger. A hot-pass outlet duct 17 communicates with the inlet of expansion means in the form of a turbine 18 which is coupled to the cell ring (not shown) of the divider 11 by a shaft 19 and is also coupled to the rotor of a combined motor-generator 20 by a shaft 21. An outlet duct 22 of the turbine 18 communicates with a cold-pass 23 of a second heat-exchanger; the hot-pass 24 of which conveys coolant from an inlet duct 25 to an outlet duct 26 leading to an aircraft structure cooling circuit which includes a circulating pump, not shown. An outlet duct 27 of the cold-pass 23 and an outlet duct 28 of the cold-pass 15 are each open to atmosphere via orifices (not shown) facing rearwardly relative to the direction of flight of the aircraft.

In operation, intermediate-pressure ram air is fed to the divider at the inlet duct 12 and the divider divides the intermediate-pressure air into two streams, one at a lower pressure and the other at a higher pressure, which leave the divider through the outlet ducts 13 and 14 respectively. The two streams are then brought into heat-exchange relationship in the passes 15 and 16 of the first heat-exchanger in order to cool the high-pressure stream. The high-pressure stream then passes via the outlet duct 17, to drive the turbine 18 which, in turn, drives the cell ring of the divider 11 and the rotor of the motor-generator 20. In driving the turbine 18, the stream from the hot-pass 16 is further cooled and so arrives at the cold-pass 23 of the second heat-exchanger capable of absorbing a considerable quantity of heat. The fluid in the aircraft structure cooling circuit is circulated by the circulating pump and in passing through the hot-pass 24 gives up heat to the stream of air in the cold-pass 23. The streams from both the cold-pass 15 and the cold-pass 23 are then discharged through the rearwardly facing orifices thus providing an additional source of forward thrust for the aircraft.

It will be seen, from the arrangement of FIGURE 1 just described, that both the heat taken from the aircraft structure and the heat generated in the pressure divider is made to do useful work by heating the streams in the ducts 27 and 28 and therefore augmenting the propulsive thrust obtained by exhausting the flows rearwardly.

In certain circumstances the output of the turbine 18 may provide the flow of coolant fluid for use directly in the aircraft structure cooling circuit.

For flight at lower speeds it may be desirable to make the output of the pressure divider independent of the forward speed of the aircraft. This can be done by supercharging the air in the divider inlet duct 12.

Figure 2:
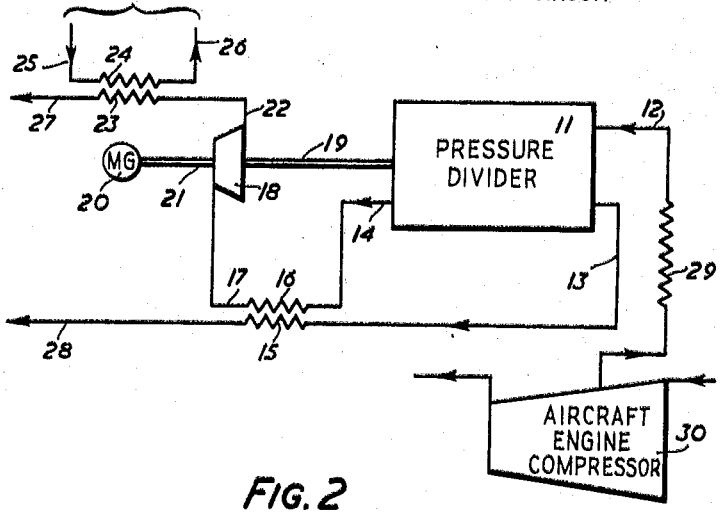
FIGURE 2 shows a modified form of the embodiment of FIGURE 1.

In the circuit shown in FIGURE 2 an aircraft gas-turbine engine compressor 30 is fed with ram air and delivers pressurized air via a cooler 29 to the intermediate-pressure air inlet duct 12 of the divider 11. The cold-pass flow for the cooler 29 is the free air stream surrounding the aircraft. In two other arrangements, not illustrated, the low-pressure outlet stream in the duct 13 or the stream leaving the turbine 18 via the duct 22 is used as the coolant for the cooler 29.

Figure 3:
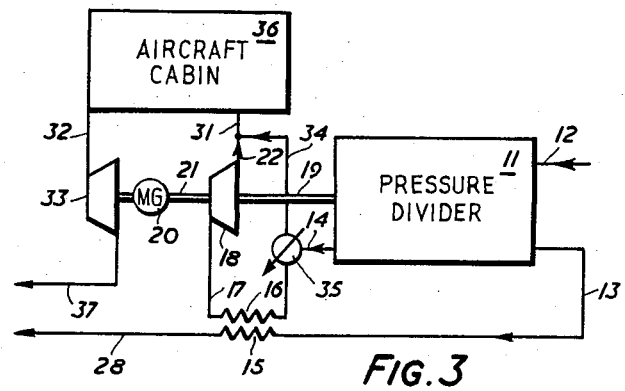
FIGURE 3 shows the circuit of an aircraft pressurization system, in accordance with the invention.

FIGURE 3 shows a circuit incorporating a pressure divider into an aircraft cabin pressurization and air conditioning system. The divider 11, the turbine 18 and the rotor of the motor-generator 20 are again coupled as in FIGURES 1 and 2. The low and high-pressure outlet ducts 13 and 14 of the divider are again brought into heat-exchange relationship in the passes 15 and 16. The flow from the outlet duct 22 of the turbine 18, however, is delivered to an aircraft cabin inlet duct whilst an aircraft cabin outlet duct 32 delivers its flow to the inlet of an additional turbine 33 which is also coupled to the rotor of the motor-generator 20 and which is provided with an outlet duct 37. A junction controlled by an apportioning valve 35 is interposed in the divider high-pressure outlet duct 14 and the additional connection provided by this junction communicates with a bypass 34 leading to the cabin inlet duct 31. This arrangement affords control over the temperature and pressure of air passed to the cabin 36.

The operation of this circuit is similar to that of the circuit shown in FIGURE 1 but in this circuit, when the turbine 18 is bypassed, the additional turbine 33 drives the rotor of the motor-generator 20 and the cell ring of the divider 11. The flow in the outlet duct 37 from the additional turbine 33 and the flow in the outlet duct 28 of the cold-pass 15 are each discharged to the rear of the aircraft.

It will be understood that the flow of fluid in the outlet duct 37 of the turbine 33 may provide the coolant fluid for use in the aircraft structure cooling circuit, in a manner hereinbefore described in relation to the turbine 18 of FIGURES 1 and 2.

Figure 4:
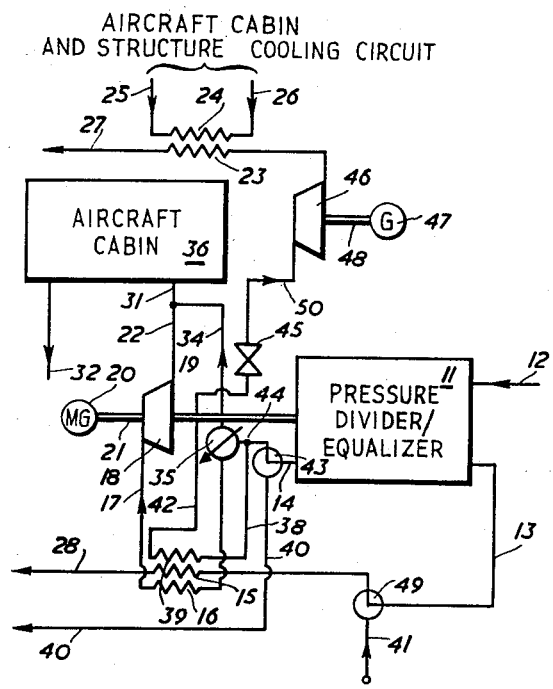
FIGURE 4 shows a circuit in accordance with the invention including the features and functions of FIGURES 1 and 3 and a part of a boundary-layer control system.

The circuit shown in FIGURE 4 combines the features and functions of the circuits shown in FIGURES 1 and 3 and also shows how the ducting may be arranged so that the pressure exchanger may be operable either as a divider or as an equalizer. In this case a junction controlled by a two-way valve 43 is interposed in the high-pressure outlet duct 14, one outlet of which valve communicates with a duct 40 whilst the other outlet communicates with the first limb of a junction 44. The second limb of the junction 44 communicates with the apportioning valve 35 whilst the third limb communicates via a duct 38 with the inlet of an additional hot-pass 39 of the first heat-exchanger. The outlet of the hot-pass 39 communicates via a duct 42 with the inlet of a control valve 45. The outlet of the valve 45 communicates via a duct 50 with a turbine 46. The turbine 46 is coupled to the rotor of an electricity generator 47 by a shaft 48. In this case the outlet of the turbine 46 communicates with the inlet of the cold-pass 23 of the second heat-exchanger. In the low-pressure outlet duct 13 a junction controlled by a two-way valve 49 is provided and the additional connection of this valve communicates with the aircraft boundary-layer suction system (not shown in detail) via a duct 41.

During take-off and landing of the aircraft, when neither cabin pressurization nor structure cooling is required, the valve 43 is set so that the outlet duct 14 communicates only with the duct 40, and the valve 49 is set so that the duct 13 communicates only with the duct 41. The pressure exchanger than functions as an equalizer, drawing low-pressure air in through the ducts 41 and 13 and high-pressure air in through the duct 12. Air at medium pressure is discharged through the ducts 14 and 40. During normal flight the valve 49 is reset to the position as shown in the drawing, to isolate the duct 41 and to connect the duct 13 to the cold-pass 15. To isolate the duct 40 and to allow the stream in the duct 14 to pass to the junction 44, the valve 43 is also reset to the position as shown in the drawing. The pressure exchanger then operates as a divider and the cabin pressurization system functions as described with reference to FIGURE 3.

The control valve 45 is provided to control the flow to the turbine 46 and thus to the cold-pass 23. In this way, cooling of the aircraft structure may be effected as required. In passing through the turbine 46 the flow of fluid is expanded and cooled, and the turbine 46 drives the rotor of the generator 47 via the shaft 48. As in the cases of FIGURES 1 and 3 the inlet 12 of the pressure exchanger 11 may be supplied with ram air or a supply of pressurized air from any other source, for example, the air compressor of the aircraft propulsion engine.

In each of the embodiments shown, the motor-generator 20 may be controlled by a device sensitive to the speed of the shaft 21, thus providing means for maintaining the pressure exchanger rotor at a constant speed by controlling the amount of work put into or taken out of the shaft 21 by the motor-generator 20.

Similarly, the generator 47 may be controlled by a device sensitive to the speed of the shaft 48.

The motor-generator 20 when energised by a supply of electric current will provide means for rotating the pressure exchanger rotor for starting purposes.

What I claim is:

1. An aircraft system incorporating a pressure exchanger operable as a pressure divider which divider has an intermediate-pressure inlet duct, a high-pressure outlet duct and a lower-pressure outlet duct, a heat-exchange means having a hot pass communicating with the high-pressure outlet duct and a cold pass communicating with the lower-pressure outlet duct, and expansion means the inlet of which communicates with the outlet of the hot pass of the heat-exchange means and the exhaust flow of which provides a heat sink for the aircraft structure.

2. An aircraft system as claimed in claim 1, in which the exhaust duct of the expansion means communicates with the aircraft cabin.

3. An aircraft system as claimed in claim 1, in which the expansion means is a turbine coupled to drive the cell ring of the pressure exchanger.

4. An aircraft system as claimed in claim 1, in which the expansion means is coupled to drive the rotor of an electric motor-generator.

5. An aircraft system as claimed in claim 1, including a by-pass duct communicating with the high-pressure outlet duct and the exhaust duct of the expansion means, and an apportioning valve to conrtol the distribution of the flow of fluid from the high-pressure outlet duct into the hot pass of the heat-exchange means and the exhaust duct of the expansion means.

6. An aircraft system as claimed in claim 5, including an additional expansion means coupled to drive the cell ring of the pressure exchanger, which expansion means receives working fluid from the aircraft cabin.

7. An aircraft system as claimed in claim 1, in which the high-pressure output and the lower-pressure output of the pressure divider are ultimately discharged to the rear of the aircraft.

8. An aircraft system as claimed in claim 1, including a junction controlled by a two-way valve in the high-pressure outlet duct at a point upstream of the said heat-exchange means and the expansion means, the additional connection provided by this junction communicating directly with a duct discharging to the rear of the aircraft, and a further junction controlled by a two-way valve in the lower-pressure outlet duct at a point upstream of the said heat-exchange means, the additional connection provided by this junction communicating via a duct directly with a boundary-layer region of the aircraft, the two-way valves being conjointly operable at will to make the high-pressure outlet duct communicate directly and only with the duct discharging to the rear of the aircraft and to make the lower-pressure outlet duct communicate via a duct directly and only with at least a part of the boundary-layer region of the aircraft.

9. An aircraft system as claimed in claim 5, including a junction controlled by a two-way valve in the high-pressure outlet duct at a point upstream of the said heat-exchange means, the turbine and the apportioning valve, the additional connection provided by this junction communicating directly with a duct discharging to the rear of the aircraft, and a further junction controlled by a two-way valve in the low-pressure outlet duct at a point upstream of the said heat-exchange means, the additional connection provided by this junction communicating via a duct directly with a boundary-layer region of the aircraft, the two-way valves being conjointly operable at will to make the high-pressure outlet duct communicate directly and only with the duct discharging to the rear of the aircraft and to make the lower-pressure outlet duct communicate via a duct directly and only with at least a part of the boundary-layer region of the aircraft.

10. An aircraft system as claimed in claim 6, including a junction controlled by a two-way valve in the high-pressure outlet duct at a point upstream of the said heat-exchange means, the turbine and the apportioning valve, the additional connection provided by this junction communicating directly with a duct discharging to the rear of the aircraft, and a further junction controlled by a two-way valve in the low-pressure outlet duct at a point upstream of the said heat-exchange means, the additional connection provided by this junction communicating via a duct directly with a boundary-layer region of the aircraft, the two-way valves being conjointly operable at will to make the high-presusre outlet duct communicate directly and only with the duct discharging to the rear of the aircraft and to make the lower-pressure outlet duct communicate via a duct directly and only with at least a part of the boundary-layer region of the aircraft.

References Cited in the file of this patent
UNITED STATES PATENTS

| | | |
|---|---|---|
| 2,916,890 | Stein | Dec. 15, 1959 |
| 2,952,986 | Spalding | Sept. 20, 1960 |
| 2,971,343 | Spalding | Feb. 14, 1961 |